United States Patent
Hunze

(10) Patent No.: US 8,960,633 B2
(45) Date of Patent: Feb. 24, 2015

(54) ADJUSTING TOOL

(75) Inventor: Sven Hunze, Sehnde (DE)

(73) Assignee: Status Pro Maschinenmesstechnik GmbH, Bochum (DE)

( * ) Notice: Subject to any disclaimer, the term of this patent is extended or adjusted under 35 U.S.C. 154(b) by 869 days.

(21) Appl. No.: 13/086,259

(22) Filed: Apr. 13, 2011

(65) Prior Publication Data
US 2011/0283823 A1 Nov. 24, 2011

(30) Foreign Application Priority Data

Apr. 15, 2010 (DE) .......................... 10 2010 027 834

(51) Int. Cl.
*F16M 7/00* (2006.01)
(52) U.S. Cl.
CPC ...................................... *F16M 7/00* (2013.01)
USPC ............................................ 248/657; 403/44
(58) Field of Classification Search
USPC ...................... 248/657; 403/43–48
See application file for complete search history.

(56) References Cited

U.S. PATENT DOCUMENTS

| 1,987,726 | A | * | 1/1935 | Wilkerson et al. ............ 248/657 |
| 2,004,238 | A |   | 6/1935 | Fithian et al. |
| 2,746,313 | A | * | 5/1956 | Roubal ........................... 74/397 |
| 2,940,784 | A | * | 6/1960 | Fell ............................... 74/89.35 |
| 4,993,673 | A | * | 2/1991 | Hirose ........................ 248/176.3 |

FOREIGN PATENT DOCUMENTS

DE  32 09 886  3/1982
WO  WO 99/47822  9/1999

* cited by examiner

*Primary Examiner* — David M Fenstermacher
*Assistant Examiner* — Terence Boes
(74) *Attorney, Agent, or Firm* — Greer, Burns & Crain, Ltd.

(57) ABSTRACT

The invention provides an adjustment device and a method for the adjustment of a machine by means of the adjustment device which has a carrier block and a spindle guided in the carrier block, which spindle has an extension piece at its first end. The carrier block has a contact surface spaced from the guiding section of the spindle, e.g. which contact surface is at the surface of the carrier block facing the extension piece, and is particularly approximately in perpendicular to the axis of the spindle. Upon moving the spindle along its longitudinal axis in the guiding section in the carrier block the extension piece is moved against the plane in which the contact surface is arranged.

Figure 1:
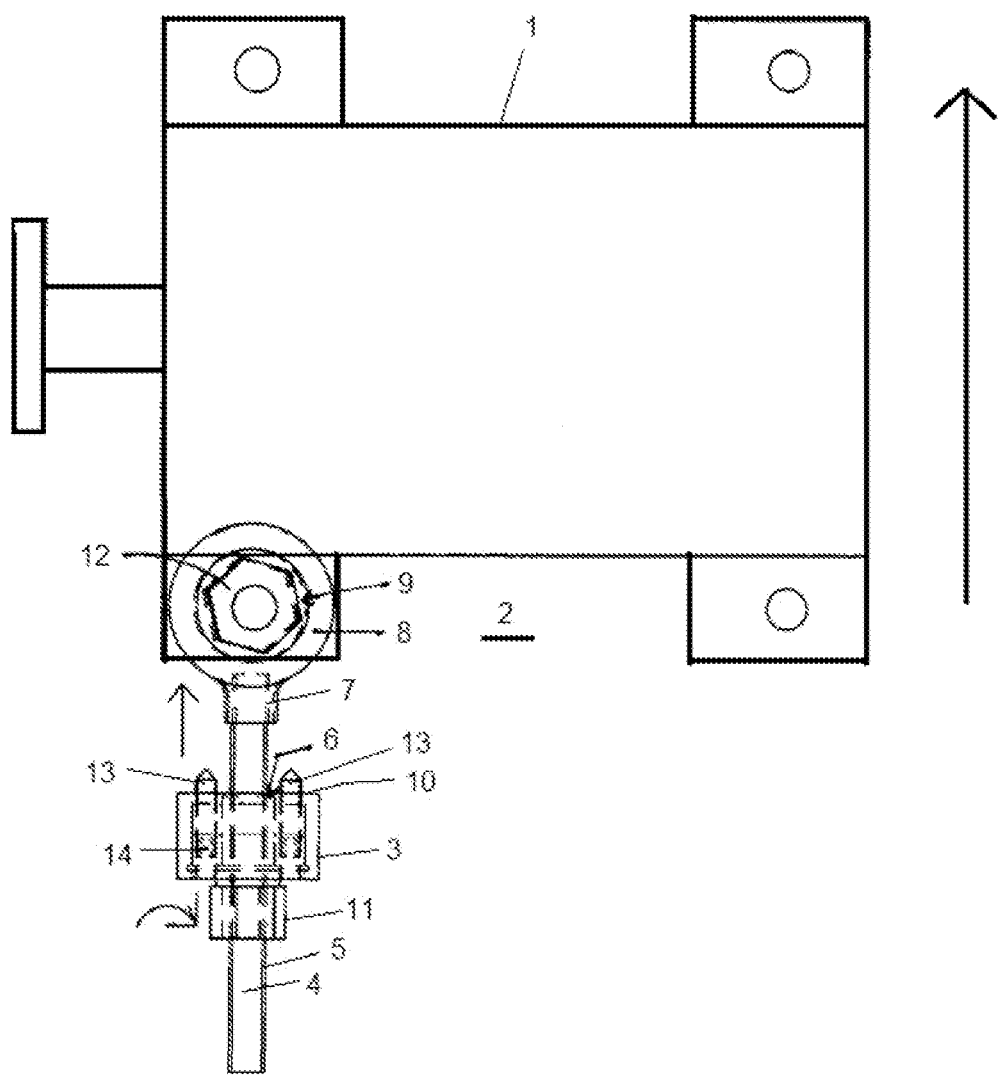

14 Claims, 5 Drawing Sheets cross-section A-A cross-section A-A

ADJUSTING TOOL

The invention relates to an adjustment device, with which machines can be shifted precisely into a desired position, for example to connect the shaft of the machine to another shaft to a common axle. The device according to the invention is characterized in that it can be arranged between a loose point and a fixed point without the establishment of a fastened connection, for example through welding or screwing of one of their elements, and in that a force can be applied between the loose point and the fixed point by the device, in order to shift these against each other, wherein the device can be removed from loose point and fixed point subsequently, without a clamping device or welding remaining at the loose point or at the fixed point. Preferably, one of loose point and fixed point is at a machine, whereas the other one is connected to the support, on which the machine is arranged. Furthermore, the invention relates to a method for the adjustment of a machine slideable on a support, preferably with subsequent fixation of the machine to the support, e.g. by means of a threaded joint, optionally while the adjustment device is arranged at the machine and/or at the fixed point.

STATE OF THE ART

When adjusting machines, for example for fitting arrangement of two shafts, which are connected to each other by means of a clutch, it is known to move the one machine on its support using concerted hammer scales against the foot of the machine.

OBJECT OF THE INVENTION

The object of the invention is to provide an adjustment device, with which a machine can be shifted on a support into a desired position. Particularly preferred, the object is to provide an adjustment device which can apply a force to the machine without a mechanical attachment to the machine which is to be adjusted, so that the device can be removed after the adjustment without further ado.

SUMMARY OF THE INVENTION

The invention attains the object by the features of the claims, and especially by an adjustment device and a method for the adjustment of a machine by means of the adjustment device, which has a carrier block and a spindle guided in the carrier block, which has an extension piece at its first end. The carrier block has a contact surface or an abutting surface spaced from the guiding section of the spindle, which is for example located at the surface of the carrier block facing the extension piece, and is particularly located approximately perpendicular to the axis of the spindle. When moving the spindle along its longitudinal axis in the guiding section of the carrier block, the extension piece is moved against the plane, in which the contact surface is arranged. The movement of the spindle in its guiding section can occur in that a spindle nut is arranged on the spindle, which is arranged rotatably against the carrier block and preferably connected to the carrier block. Preferably, the spindle nut is arranged on that side of the carrier block which is opposite the extension piece; particularly preferred, the spindle is guided in a roller bearing in the carrier block, wherein, more preferred, the spindle nut is connected to the rotatable part of the roller bearing. The rolling bearing can be a ball bearing, and preferably has a ball bearing, which can absorb axial forces. In this embodiment, the extension piece is fastened to the first end of the spindle, for example by a fastened threaded joint. With the arrangement of the extension piece around an element of the machine or around a part connected to the support, for example a screw arranged in a thread of the support, the rotation of the extension piece around the longitudinal axis of the spindle is limited, so that a shifting of the spindle along its guiding section is generated by turning of the spindle nut.

DESCRIPTION OF THE INVENTION

In a simple embodiment, the spindle is guided in a thread in the carrier block, so that turning of the spindle against the carrier block leads to its longitudinal displacement. In this embodiment, the spindle at its first end is rotatably connected to the extension piece, so that the extension piece can be arranged around an element and the spindle is rotatable against the extension piece. Preferably, in this embodiment the spindle has a seat for a tool at its first end which is opposite the second end, for example, a screw head solidly connected to the spindle at its second end, or a manageable handle.

The adjustment method for shifting of the machine across the support preferably takes place in that the extension piece is arranged with its recess around a fixed point and the contact surface of the carrier block is arranged against a loose point, especially a part connected to the casing of the machine, whereby the extension piece is drawn towards the carrier block by movement of the spindle along its guiding section. Particularly preferred, the loose point is a screw head of a screw, which is guided in a thread in the support, whereas the loose point is a section of the casing of the machine.

The particular advantage of the device according to the invention is that a precise movement of the extension piece in the direction of the contact surface of the carrier block is achieved by movement of the spindle, especially by turning of the spindle nut or by turning the spindle in the thread of the carrier block guiding the spindle, without the need for a fixation of a part of the device to the machine or the support. This is because the adjustment device according to the invention can be connected detachably to the machine and the support, respectively, by arranging the extension piece or the recess comprised by the extension piece around a first element, and arranging the contact surface of the carrier block against a second element, so that especially no clamping connection, screw joint, and also no firmly bonded connection to the support or to the machine is necessary.

SHORT DESCRIPTION OF THE FIGURES

Figure 2:
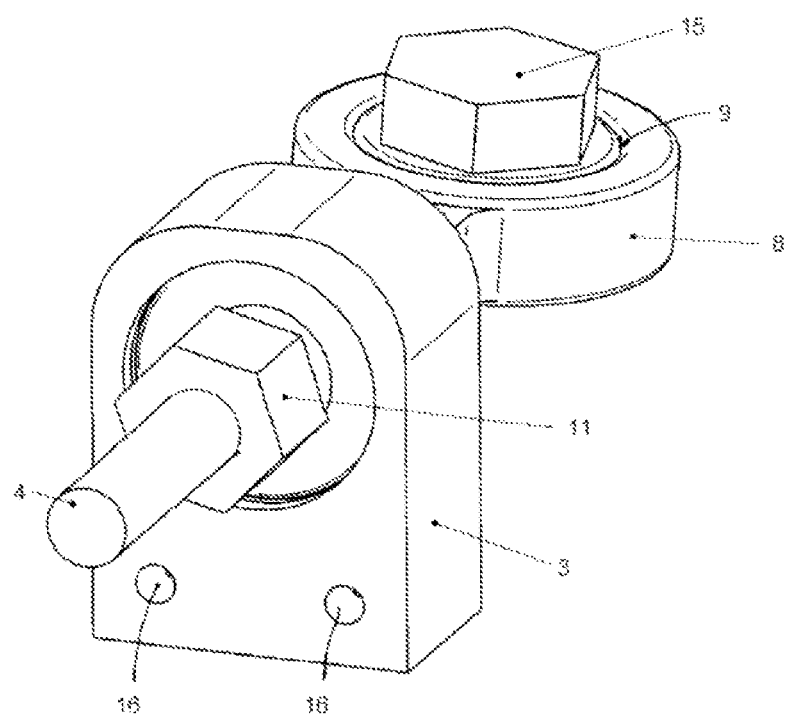
Figure 3:
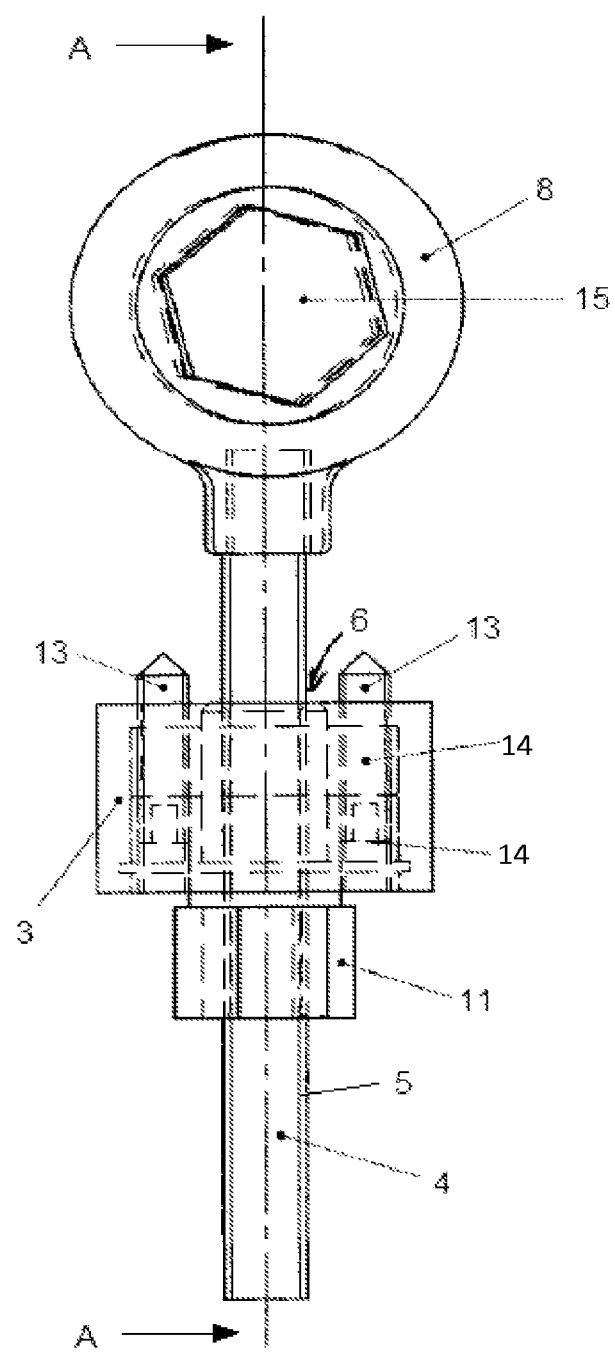
Figure 4:
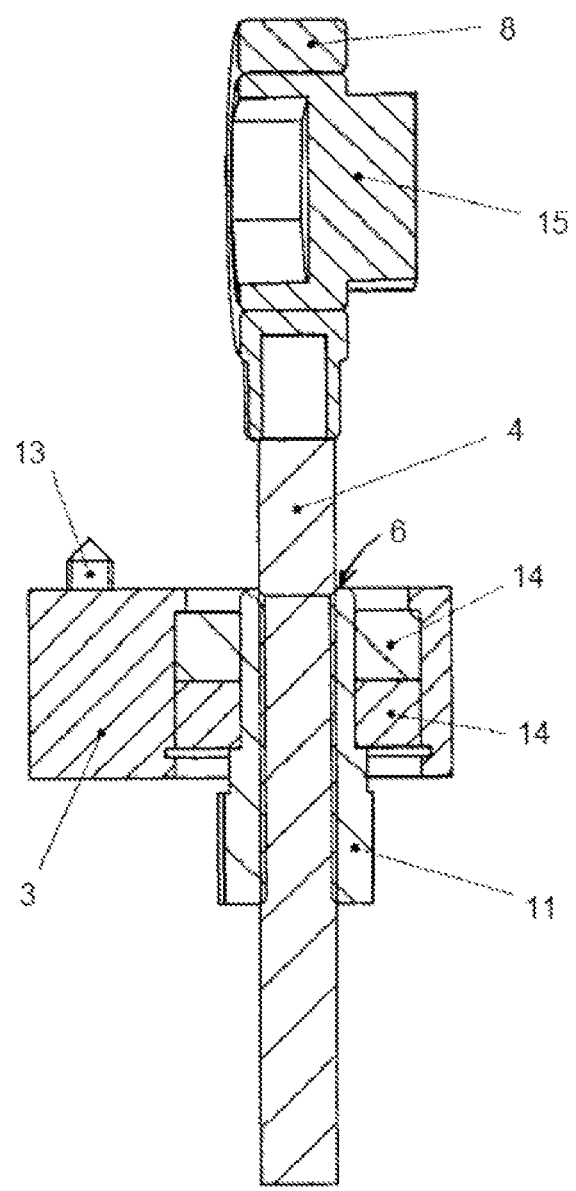
Figure 5:
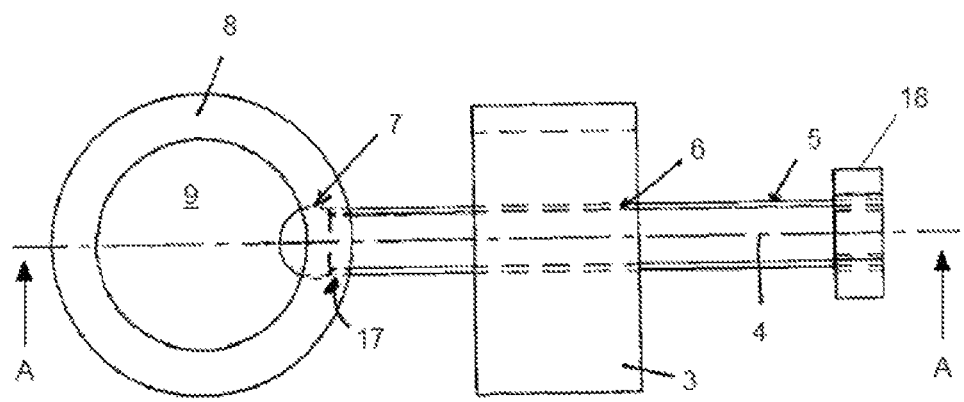
Figure 6:
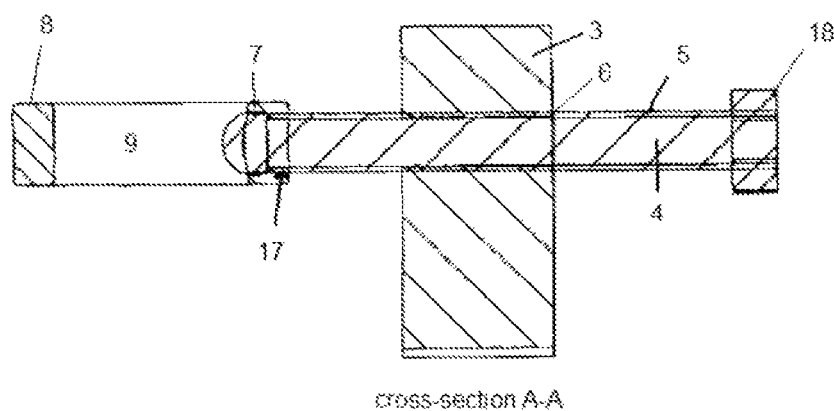

The invention is now described in greater detail with reference to the figures, in which FIG. 1 shows a schematic overview of the device, FIG. 2 shows a schematic perspective top view of the device, FIG. 3 shows a schematic view of a device according to the invention, FIG. 4 shows a sectional view along A-A of FIG. 3, FIG. 5 shows a schematic view of an alternative embodiment of the device according to the invention, and FIG. 6 shows a sectional view along A-A of FIG. 5.

DETAILED DESCRIPTION OF THE FIGURES

In the figures, identical reference numbers denote functionally equal elements.

FIG. 1 shows the machine 1, which is movable on the support 2, which corresponds to the surface below the machine 1. At a corner the machine 1 has a foot with a bore, through which screws can be arranged, which engage in threads of the support 2. Preferably, for the use of the device according to the invention, the fixed point is a screw head 12 of a screw, which is guided through a bore in the machine 1 and engages in a thread in the support 2. Such a screw head 12 serves as fixed point, whereas a surface section of the machine 1, for example the outer surface arranged perpendicularly at the left foot in FIG. 1, serves as loose point. The device has a carrier block 3, at which a contact surface 10 is arranged, which can be arranged against a loose point, for example a surface section of the machine 1. A spindle 4 with a thread 5 is guided in the carrier block 3. At the first end 7 of the spindle 4 the extension piece 8 is arranged, which has a recess 9, in this case shown according to the preferred embodiment with circular inner cross-section. The extension piece 8 is arranged with its recess 9 around the fixed point, in this case the screw head 12 of the screw, which is guided in a thread in the support 2. In the alternative to the contact surface 10, the carrier block 3 can be arranged against a section of the machine 1 by the setscrews 13 guided in tapped holes 16 being arranged against a section of the machine 1.

The spindle 4 is guided in a ball bearing 14, which is arranged in carrier block 3, so that the spindle 4 is arranged approximately perpendicular to the contact surface 10 of the carrier block 3. The spindle nut 11 is in engagement to the thread 5 of the spindle 4 and lies against the surface of the carrier block 3, which is located opposite to the extension piece 8. In accordance with the preferred embodiment, the spindle nut 11 is connected to the moveable part of the ball bearing 14, so that the spindle 4 is guided along its guiding section 6 in the carrier block 3 by turning the spindle nut 11, whereas the extension piece 8 is secured against rotation by its engagement to the screw head 12.

In the use of the device for the adjustment of the machine 1 on the support 2 as shown in FIG. 1, a force can only be applied from the contact surface 10 and by the setscrews 13, respectively, against the machine 1, which is directed towards the extension piece 8 or the screw head 12 enclosed by the extension piece 8. Correspondingly, the extension piece 8 would be pulled into direction of the carrier block 3 by the spindle 4 by turning the spindle nut 11 when the thread 5 is right-handed, whereby a force would be applied against the foot of the machine 1 shown on the lower left in direction of the arrow, so that the machine 1 is moved in the direction of the arrow shown onto the right of the machine 1.

FIG. 2 shows the device with the carrier block 3, in which the spindle 4 is arranged in a guiding section 6 arranged in perpendicular to both the parallel outer surfaces of the carrier block 3. The spindle nut 11 is arranged against the bearing 14, in which the spindle 4 is guided. At the first end of the spindle 4, an extension piece 8 is arranged, which has a recess 9 with a circular cross-section. According to the preferred embodiment, an inset 15 is arrangeable in recess 9, which inset 15 is guided in the recess 9 rotatably about an axis perpendicular to spindle 4. Preferably, the inset 15 at its side accessible from the outside has the surface of a screw head, for example a hexagon or a surface element for the engagement of a socket wrench, while the inset 15 is a screw driver at its opposite side which is not shown that can engage a screw head 12. Due to the preferred embodiment of one side of the inset 15 for the engagement to a screwdriver, preferably to a socket wrench (ratchet) and at its opposite side as a screw driver, the inset 15 preferably is a rotational socket for wrenches (socket). Furthermore the tapped holes 16 are visible, in which the setscrews 13 are guided, which protrude beyond the contact surface 10 averted in FIG. 2.

FIG. 3 shows the preferred embodiment of the adjustment device, in which the ball bearing 14 forms the guiding section 6 of the carrier block 3 for the spindle 4, which protrudes beyond the carrier block 3 approximately perpendicular to the contact surface 10. At the first end 7 of the spindle 4 the extension piece 8 with its circular recess 9 is arranged, in which the inset 15 is arrangeable rotatably. The setscrews 13 protrude beyond the contact surface 10 out of their tapped holes 16. Preferably, the setscrews 13 at the end, which is averted to the contact surface 10, have a screw head, e.g. a hexagon socket as depicted.

The section A-A of FIG. 3 is shown in FIG. 4 and reveals that the ball bearing 14 can consist of two separate bearings, for example of one bearing which absorbs axial forces, occurring at turning of spindle nut 11 between the extension piece 8 and the spindle nut 11 and optionally by means of the inset 15, when a compressive stress against the extension piece 8 is established between the setscrews 13 and the contact surface 10, respectively.

The outer ring of a ball bearing 14 is preferably arranged against a shoulder of a recess in the carrier block 3, which adjoins the plane, in which the contact surface 10 extends.

From FIGS. 3 and 4 it is apparent that in the preferred embodiment the inset 15 preferably has an at least sectionally cylindrical outer surface, which is supported or guided rotatably by the recess 9 of the extension piece 8. Thus, a screw head 12, which is in engagement to the screwdriver of the inset 15, can be fixed by rotation with the adjustment device arranged, namely by means of a tool, which acts at the side of the inset 15 opposite the screwdriver. Due to the embodiment of the one side of the inset 15 as a screwdriver, in FIG. 4 shown on the left side of the inset 15, whereas the opposite side of the inset 15 is designed for the engagement of a tool, the inset 15 can be a socket for wrenches, which is guided rotatably in the recess 9 of the extension piece 8.

A simple embodiment of the device according to the invention is shown in FIGS. 5 and 6. In this embodiment the guiding section 6 of the carrier block 3 is provided with a thread, into which the thread 5 of the spindle 4 engages. The extension piece 8 is arranged rotatably at the first end 7 of the spindle 4, so that the rotation of the spindle 4 within the guiding section 6 of the carrier block 3 shifts the extension piece 8 against the carrier block 3 and against its contact surface 10, respectively, while recess 9 of the extension piece 8 can be arranged around a fixed point. In this embodiment the spindle 4 can be arranged by its first end 7 rotatably in the extension piece 8 by the extension piece 8 having a bore, in which the first end 7 of the spindle 4 is arranged rotatably, for example a bore that preferably has a chamfer in which a section of the first end 7 of the spindle 4 is arranged rotatably. For example at the first end 7 of the spindle 4 a ball can be fastened which has a larger cross-section than the bore in the extension piece 8.

FIG. 6 shows a sectional view along A-A of FIG. 5 and reveals that in a simple embodiment the extension piece 8 can have a bore in parallel to the plane which is generated by the recess 9. The spindle 4 is arranged rotatably in the bore 17 of the extension piece 8 with its thickened first end 7, which is thickened for example by a terminal ball.

For rotation, the spindle 4 preferably at its second end which is located opposite its first end 7, has a screw head or another attachment piece 18, to which a tool can engage. For example, such an attachment piece 18 can be a hexagonal screw head, or a recess for plugging in of a socket wrench.

LIST OF REFERENCE MARKS 1 machine
2 support 3 carrier block
4 spindle
5 thread
6 guiding section
7 first end
8 extension piece
9 recess
10 contact surface
11 spindle nut
12 screw head
13 setscrew
14 ball bearing
15 inset
16 tapped hole
17 bore
18 attachment piece

The invention claimed is:

1. An adjustment device for the adjustment of a machine by shifting the machine on a support, the device having a carrier block, a spindle guided in the carrier block and which is moveable along a guiding section relative to the carrier block by a thread, wherein the spindle has an extension piece with a recess at a first end, the extension piece being arrangeable around an element stationarily connected to the support, and wherein the carrier block has a contact surface spaced from the guiding section of the spindle, the contact surface being arrangeable against a surface of the machine, wherein the thread is arranged in a spindle nut, which is arranged around the spindle at the side of the carrier block opposite to the extension piece of the spindle and wherein the guiding section of the spindle is a bearing arranged in the carrier block.

2. The adjustment device according to claim 1, wherein the spindle nut is connected to the part of the bearing which is moveable against the carrier block.

3. The adjustment device according to claim 1, wherein the spindle at its first end is fastened to the extension piece.

4. The adjustment device according to claim 1, wherein the bearing comprises an axially loadable ball bearing.

5. The adjustment device according to claim 1, wherein the guiding section is a thread arranged in the carrier block, which thread guides the spindle, and the spindle at its first end is arranged rotatably in the extension piece.

6. The adjustment device according to claim 1, wherein an inset moveable perpendicularly to the axis of the spindle is arranged in the recess of the extension piece, which inset at its first side is configured as a screwdriver and is configured to engage a screwdriver at its opposite second side.

7. The adjustment device according to claim 6, characterized in that the recess of the extension piece has an at least sectionally cylindrical surface in which the inset having a fittingly arranged and at least partially cylindrical outer surface is rotatable about an axis perpendicular to the longitudinal axis of the spindle.

8. The adjustment device according to claim 7, characterized in that the at least sectionally cylindrical surface of the recess in the extension piece is arranged perpendicularly to the longitudinal axis of the spindle.

9. The adjustment device according to claim 7, characterized in that the inset is a socket for wrenches (socket) which is rotatable in the recess of the extension piece.

10. The adjustment device according to claim 1, wherein the contact surface protrudes over the plane of the carrier block into which plane the guiding section of the spindle extends.

11. An adjustment device for the adjustment of a machine by shifting the machine on a support, the device having a carrier block, a spindle guided in the carrier block and which is moveable along a guiding section relative to the carrier block by a thread, wherein the spindle has an extension piece with a recess at a first end, the extension piece being arrangeable around an element stationarily connected to the support, and wherein the carrier block has a contact surface spaced from the guiding section of the spindle, the contact surface being arrangeable against a surface of the machine, wherein the carrier block in the region of its contact surface has at least two bores having internal threads arranged in parallel to the spindle, in which internal threads setscrews are guided that can protrude beyond the contact surface.

12. A method for the adjustment of a machine, the method comprising shifting the machine along a support by arranging an adjustment device having a recess around a screw head of a screw which is arranged in a thread in the support, and wherein a contact surface is arranged opposite to a section of a casing of the machine, and guiding a spindle within a carrier block using a thread of the spindle wherein the spindle has an extension piece with the recess at a first end, the extension piece being arrangeable around an element stationarily connected to the support, and wherein the carrier block has the contact surface spaced from the guiding section of the spindle, the contact surface being arrangeable against a surface of the machine, wherein the thread is arranged in a spindle nut, which is arranged around the spindle at the side of the carrier block opposite to the extension piece of the spindle and wherein the guiding section of the spindle is a bearing arranged in the carrier block.

13. The method according to claim 12, wherein an inset is arranged in the recess of the extension piece, the inset comprising the screw head, and the inset is turned after shifting of the spindle for driving the screw into the support.

14. The method according to claim 13, wherein the inset is turned while the inset is strained by the recess against the carrier block.

* * * * *